United States Patent
Liguori

(10) Patent No.: US 12,242,951 B2
(45) Date of Patent: Mar. 4, 2025

(54) HIGHLY PARALLEL CONVOLUTIONAL NEURAL NETWORK

(71) Applicant: Ocean Logic Pty Ltd, San Ramon, CA (US)

(72) Inventor: Vincenzo Liguori, Manly (AU)

(73) Assignee: Ocean Logic Pty Ltd, Manly (AU)

( * ) Notice: Subject to any disclaimer, the term of this patent is extended or adjusted under 35 U.S.C. 154(b) by 933 days.

(21) Appl. No.: 17/348,395

(22) Filed: Jun. 15, 2021

(65) Prior Publication Data

US 2021/0312270 A1 Oct. 7, 2021

Related U.S. Application Data

(63) Continuation of application No. PCT/AU2020/050083, filed on Feb. 5, 2020.

(30) Foreign Application Priority Data

Feb. 7, 2019 (AU) ................ 2019900380

(51) Int. Cl.
*G06F 5/10* (2006.01)
*G06F 7/523* (2006.01)
*G06F 7/544* (2006.01)
*G06N 3/063* (2023.01)

(52) U.S. Cl.
CPC ............ *G06N 3/063* (2013.01); *G06F 5/10* (2013.01); *G06F 7/523* (2013.01); *G06F 7/5443* (2013.01)

(58) Field of Classification Search
CPC .......... G06F 5/10; G06F 7/5443; G06N 3/045
USPC ..................................... 708/603
See application file for complete search history.

(56) References Cited

U.S. PATENT DOCUMENTS

| 10,853,068 B2 * | 12/2020 | Liguori ................ G06F 17/16 |
| 2018/0157940 A1 | 6/2018 | Yang et al. |
| 2018/0247180 A1 | 8/2018 | Cheng et al. |
| 2018/0253636 A1 | 9/2018 | Lee et al. |
| 2018/0341495 A1 | 11/2018 | Culurciello et al. |

FOREIGN PATENT DOCUMENTS

KR 10-2019-0004306 A 1/2019

OTHER PUBLICATIONS

Preliminary Report of Patentability dated Aug. 19, 2021, PCT/AU2020/050083.

* cited by examiner

*Primary Examiner* — Tan V Mai
(74) *Attorney, Agent, or Firm* — Dov Rosenfeld; Inventek

(57) ABSTRACT

A CNN inference engine that convolves an input data set with a weight data set is disclosed together with components that facilitate such computation. The engine includes a plurality of multiply and accumulate processors (MACs), each MAC causing a value in the accumulator to be augmented by a product of a data value received on an input data port, a weight value received on a weight port. The engine also includes a slice buffer having a plurality of output ports, each output port being connected to one of the MAC input data value ports. The engine causes the slice buffer to connect one of the slices to the plurality of slice buffer output ports, and causes a weight received on an inference engine weight port to be input to each MAC weight port. The MACs process the input data values on the output ports in the slice in parallel.

20 Claims, 10 Drawing Sheets

HIGHLY PARALLEL CONVOLUTIONAL NEURAL NETWORK

RELATED APPLICATIONS

This application is a continuation under 35 U.S.C. § 111 of PCT/PCT/AU2020/050083, filed on 2020 Feb. 5, said PCT application claiming priority from Australian Provisional Application 2019900380, filed 2019 Feb. 7, said patent applications being incorporated by reference herein.

BACKGROUND

In the "tutored learning problem", an unknown object is to be classified as belonging to one of a finite number of sets of objects. Each object is characterized by a vector of parameters. A data processing system is presented with a learning sample consisting of the vectors corresponding to a number of examples of each known object. The software is optimized using the learning sample such that given a vector corresponding to an unknown object, the software returns the identity of the known objects that are closest to the unknown object. One type of software/hardware that has been successful in this type of tutored learning problem is often referred to as a neural-network.

In a fully connected neural network, each component of the characterization vector is connected to each "neuron" in the initial layer of neurons. In addition, there is one neuron in this layer for each component of the characterization vector. Each neuron computes a scalar product of the components connected to that network with a vector of weights. The weights are determined using a training set such that the classes of objects can be distinguished from one another. The computational workload of performing the first layer of neurons is of order $N^3$. If N is large, this workload poses challenges. In addition, if N is large, the noise in the data can slow or even prevent the determinations of the weights used by the neural network. In the case of image recognition, these problems present significant challenges, since N is of the order of $10^6$ for a 1000×1000 image. While parallel computation engines can improve the time needed to compute a layer in the neural network, the gains are insufficient to allow this type of brute force to overcome the challenges. In addition, the noise in the pixel measurements can overwhelm the computation.

One alternative to a fully connected neural network is a "convolutional neural network" (CNN). CNNs are particularly useful in problems related to image detection; however, such networks may be used in other situations. To simplify the following discussion, consider a color image of some scene. The input data set to the convolutional neural network is the array of pixel values. Since this is a color image, each point in the image includes a plurality of color channels. To simplify the discussion, it will be assumed that each pixel in the image has three color amplitudes. For a square image having M pixels on a side, the input data set includes an array of M×M×3 elements, where M is the size of the image.

A convolutional neural network generates an output data set from the input data set. The output data set is also a three-dimensional array of elements. Each element in the output array is computed by forming the scalar product of the pixels in a small sub-array of the input data set with a set of weights. This operation may be viewed as applying a local filter to a K by K block of pixels in the input data set in which the weights define the filter parameters. The output of the filter becomes one of the output parameters. Consider a K×K block of pixels in the input feature set centered around a pixel at (X0, Y0). To simplify the discussion, it will be assumed that K is odd. In general, there is a set of O filters used to generate the O output values in the output data set corresponding to (X0, Y0). Consider one of the filters. The filter includes K×K×3 weights that are applied to the K×K×3 block of input pixels. In general, the filter may also include an offset. That is, $$pout\left(\frac{x}{S_x}, \frac{y}{S_y}, o\right) = \sum_{z=0}^{Z-1}\sum_{i=0}^{K-1}\sum_{j=0}^{K-1} pin(x+j-K/2, y+i-K/2, z) * W(j, i, z, o) + b_o \quad (1)$$

Here, Z is the number of color channels in the input image, W(j,i,z,o) is a set of weights corresponding to the $o^{th}$ filter and $b_o$ is the offset of the $o^{th}$ filter. Here, Sx and Sy are the strides in the x and y directions, respectively. The strides are integers. If the strides are greater than 1, then the convolution operation generates an array of output values that is down sampled from the input data set in x and y. To simplify the following discussion, it will be assumed that Sx=Sy=1.

While the computation of the output data set can be reduced using multi-processor data processors, arranging the computation such that delays due to memory transfers between different levels of data storage present significant challenges.

SUMMARY

The present disclosure includes a CNN inference engine that convolves an input data set with a weight data set, a method for operating a data processing system to compute scalar products, and a system for computing scalar products. The CNN inference engine includes an inference engine weight port adapted to receive a weight value and a weight index vector, a plurality of multiply and accumulation (MAC) elements, each of the MACs includes an input data value port, a MAC weight port, and an accumulator, the MAC causing a value in the accumulator to be augmented by a product of a data value received on the input data port and a weight value received on the inference engine weight port, and a slice buffer characterized by a plurality of output ports, each of the plurality of output ports is connected to a unique one of the MAC input data value ports. The CNN inference engine causes the slice buffer to connect one of the slices to the plurality of slice buffer output ports, and causes the weight received on the inference engine weight port to be input to each MAC weight port, and causes the plurality of MACs to process the input data values on the output ports in the slice in parallel.

In one aspect, the MACs are general purpose MACs.

In one aspect, each MAC utilizes integer weights.

In one aspect, each MAC is a bit layer MAC (BLMAC).

In one aspect, the weights are coded using a trinary coding scheme in which numbers are represented by digits having values of −1, 0, and 1 and in which a weight is represented by a set of digits having the fewest on-zero bits for that weight while providing the desired weight value.

In one aspect, the weight data set includes a plurality of filters, each filter is adapted to filter a K×K block of input data set values to generate an output data set value, the slice buffer includes storage for K slices of the input data set, the slice buffer storing sufficient input data set values to compute a slice of the output data set.

In one aspect, the slice buffer stores K+1 slices of the input data set, the $(K+1)^{st}$ slice is loaded with a new value while the K slices are is used to compute the slice of the output data slice.

In one aspect, each of the slice output ports has a unique label and wherein the input data set values coupled to the slice buffer output ports are determined by the slice port label and the weight index vector of the weight currently coupled to the inference engine weight port.

In one aspect, the plurality of output ports in the slice buffer comprise left and right padding arrays, the left and right padding arrays providing values to the MACs for input data set values that are outside the values stored in the slice buffer.

In one aspect, the slice buffer includes a left padding out port and a right padding out port, the left padding out port connecting K/2 output ports having a first set of labels to an external device and the right padding out port connecting K/2 output ports having a second set of labels to another external device.

In one aspect, the inference engine weight port receives a run-length encoded representation of the weight data set and decodes the run-length encoded representation to provide a list of weight values that are different from zero and a number of weights to be skipped before reaching a non-zero weight value.

In one aspect, the inference engine weight port generates the weight index vector from the run-length encoded representation of the weight data set.

In one aspect, the run-length encoded representation of the weight data set includes a compressed version of the run-length encoded representation and the inference engine weight port decompresses the run-length encoded representation.

In one aspect, the compressed version of the run-length encoded representation of the weight data set is stored in a cache memory in the CNN inference engine.

A system for computing the scalar product of a vector x and a weight vector w includes one or more of BLMAC processors, each BLMAC processor including an accumulator, a shifter that shifts a number in the accumulator in response to a shift command, an input port adapted to receive a component of the x vector, a weight port adapted to receive a digit of a component of the w vector, and an add/subtract processor that processes the component of the x vector by causing the component of the x vector to be added to or subtracted from a value in the register depending on the digit and a sign input.

In one aspect, each component of the weight vector is decomposed into a plurality of digits that are ordered in an order that depends of the significance of the digits, and the system couples each of the non-zero digits to the one or more BLMAC processors and causes the BLMAC processors to process the component of the x vector in parallel, the system causing the value in each of the accumulators to be shifted after the processing.

In one aspect, the digits that are equal to zero are not coupled to the one or more BLMAC processors.

The present invention also includes a method for operating a data processing system having an accumulator and add/subtract processor to compute a scalar product of two N dimensional vectors, w and x, the vector w having components $w_i$, where $w_i = \Sigma d_{ij} 2^j$, $d_{ij}$ having an absolute value of 1 or 0, j runs from 0 to nb−1. The method includes resetting the accumulator to zero and for each j, add or subtract $x_i$ from the accumulator depending on the $d_{ij}$ value for each non-zero value of $d_{ij}$ using the add/subtract processor; and shift the accumulator one position.

In one aspect, the possible values are −1, 0, and 1.

In one aspect, the possible $d_{ij}$ values are 0 and 1.

DETAILED DESCRIPTION

As noted above, the input data set to a CNN is typically a three-dimensional array. Areas in two of these dimensions specify localized blocks of pixels that are to be filtered to generate an output data subset at a point having a location specified by the filtered areas. These two dimensions will be referred to as the x and y axes in the following discussion. The preferred choice for the x-dimension may depend on the physical hardware that generates the input data set or the memory configuration used to store the input data set during processing. For example, if the input data set is an image generated by CMOS camera chip, a two-dimensional array of pixel sensors organized in a plurality of rows and columns of pixel sensors are used in which all of the pixels in a row are processed in parallel before going on to processing the next row of pixels, and hence, the time to access a row of pixels may be substantially less than the time to access a column of pixels. In another example, the input data set may be stored in DRAM memory in which "chunks" of data values are accessed in parallel. Hence, it requires less time to load a slice even when the data is moved serially.

A slice is defined to be all of the elements of the input data set or all elements of the output data set having the same coordinate. To simplify the following discussion, it will be assumed that this coordinate is the y coordinate. However, embodiments in which x and y are interchanged can also be utilized.

In one aspect of the invention, the y axis is chosen to be the axis that requires the minimum time to move a slice from its normal storage location to a processing array described below. To simplify the following discussion, it will be assumed that the areas in the xy plane that are filtered are square; however, embodiments in which the areas are rectangular can also be constructed. The size of the square areas will be denoted by K in the following discussion. From Eq. 1, it can be seen that the portion of the input data set needed to compute one slice of the output data set is K slices of the input data set independent of the size of the input data set.

In one aspect, a high-speed data buffer is provided for caching the K slices needed for computing one slice of the output data set. For reasons that will be discussed below, the buffer actually holds K+1 input data slices. The extra data slice enables the processing of the next output data slice in a sequence of data slice computations to be started immediately upon finishing the previous output data slice. For example, if the input data set is an image having M×M pixels with each pixel having three color components, the input data buffer requires only storage for 3*(K+1)*M data words. If each color channel is one byte, K=16, M=1000, the buffer would need to be only 51,000 bytes.

Figure 2:
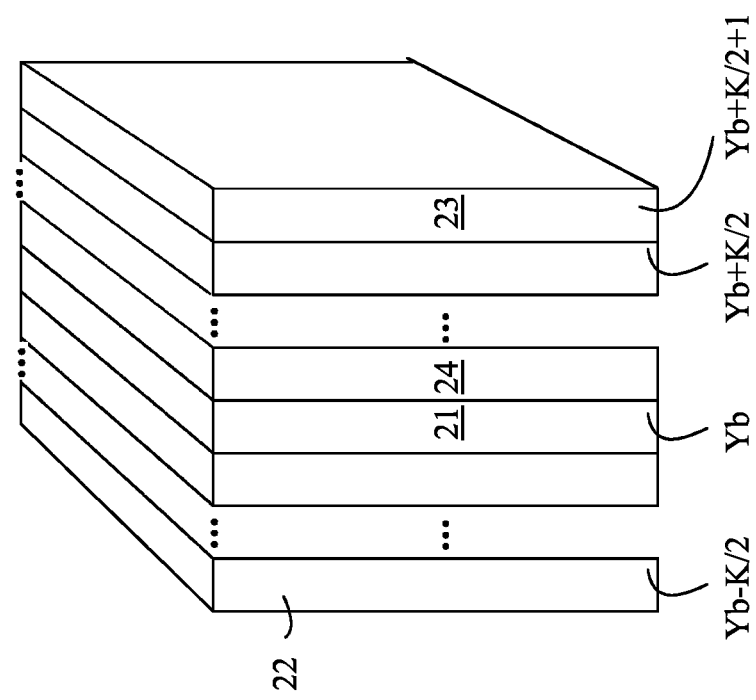
FIG. 2 illustrates an embodiment of a high-speed data buffer that can be used as part of the embodiments of the present invention.

Refer now to FIG. 2, which illustrates an embodiment of a high-speed data buffer that can be used as part of the embodiments of the present invention. Conceptually, the high-speed data buffer may be modeled as a sequence of storage slots, each storage slot holding a slice of the input data set. Exemplary storage slots are shown at 21 and 22. Preferably, there are K+1 such slots. Consider the case in which a slice of the output data set is being calculated. Denote the Y value of the output data slice by $Y_b$. To compute the output data slice, input data set values corresponding to $Y_{b-K/2}$ through $Y_{b+K/2}$ are needed. The buffer slot corresponding to $Y_b$ can be thought of as being the buffer slot in the middle of the bank of K slices as shown at 21 in FIG. 2. During the processing of the output data slice corresponding to $Y_b$, the system controller proceeds to load the next data slice into slot location 23. By the time the output data slice corresponding to $Y_b$ is completed, the input data slice corresponding to $Y_{b+K/2+1}$ will have been loaded into the high-speed buffer and will be ready for use in computing the output data slice corresponding to $Y_{b+1}$. After the output data slice for the slice corresponding to $Y_b$ has been completed, the stack of slots is conceptually shifted to the left, such that slot 21 now contains the slice that has been previously stored in slot 24. The slice that was previously stored in slot 22 is overwritten. At this point, the processing system can proceed to compute the next output slice.

While the operations described above can be thought of as a large shift register, in practice data is not shifted between the slots. Each slot has a pointer indicating the input data set slice that is currently stored in that slot. When the buffer is "shifted", the pointer for the newly arrived data is updated and the pointer for the oldest data is set to indicate that the slot in question is now available for preloading. Given a request for data corresponding to a given Y value in the buffer, the system controller merely accesses a table that holds the correspondence between the Y values of the slices stored in the buffer and the absolute buffer addresses.

Figure 1:
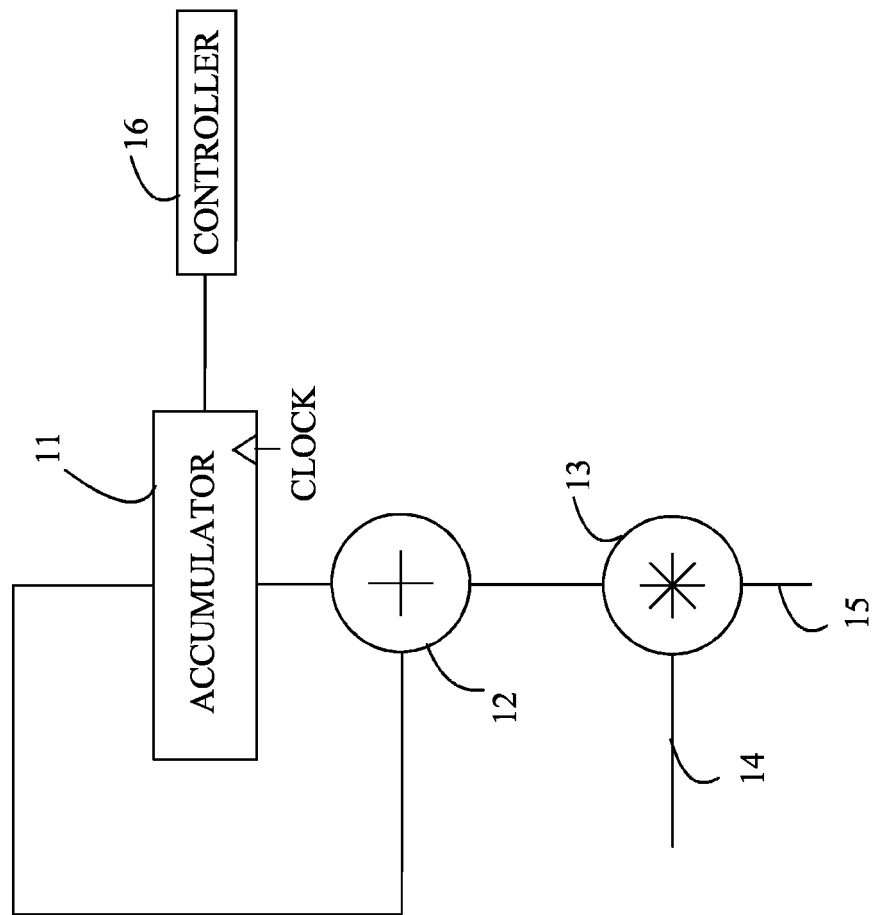
FIG. 1 illustrates one embodiment of a processing element that may be utilized in the present invention.

In another aspect, the actual output slice computations are performed by a plurality of processing elements that operate in parallel to compute the current output slice. Refer now to FIG. 1, which illustrates one embodiment of a processing element that may be utilized in the present invention. Processing element 10 includes a multiply and accumulate processor that may be used in the construction of such a processing element. To distinguish this MAC from other MACs discussed below, this MAC will be referred to as a general MAC (gMAC) in the following discussion, as it has no limitations on the form of the weights used. The gMAC includes a multiplier 13 that multiplies the arguments on buses 14 and 15 and then passes the product to adder 12 which adds the product to the value already in accumulator 11. A controller 16 provides the addresses to the storage buffer medium that contain the arguments that are processed by multiplier 13. In systems having multiple processing elements, a common controller can be used to control the processing elements.

In one exemplary embodiment, there is one such processing element for each x position in the input data set. For example, in an embodiment for calculating an output data set from an M×M×Z image, there are M processing elements. To simplify the discussion, a column is defined to be all the data set values having the same (x,y). Each processing element computes a column of output data set values. That is, each processing element performs the O scalar products corresponding to the X value associated with that processing element.

Figure 3:
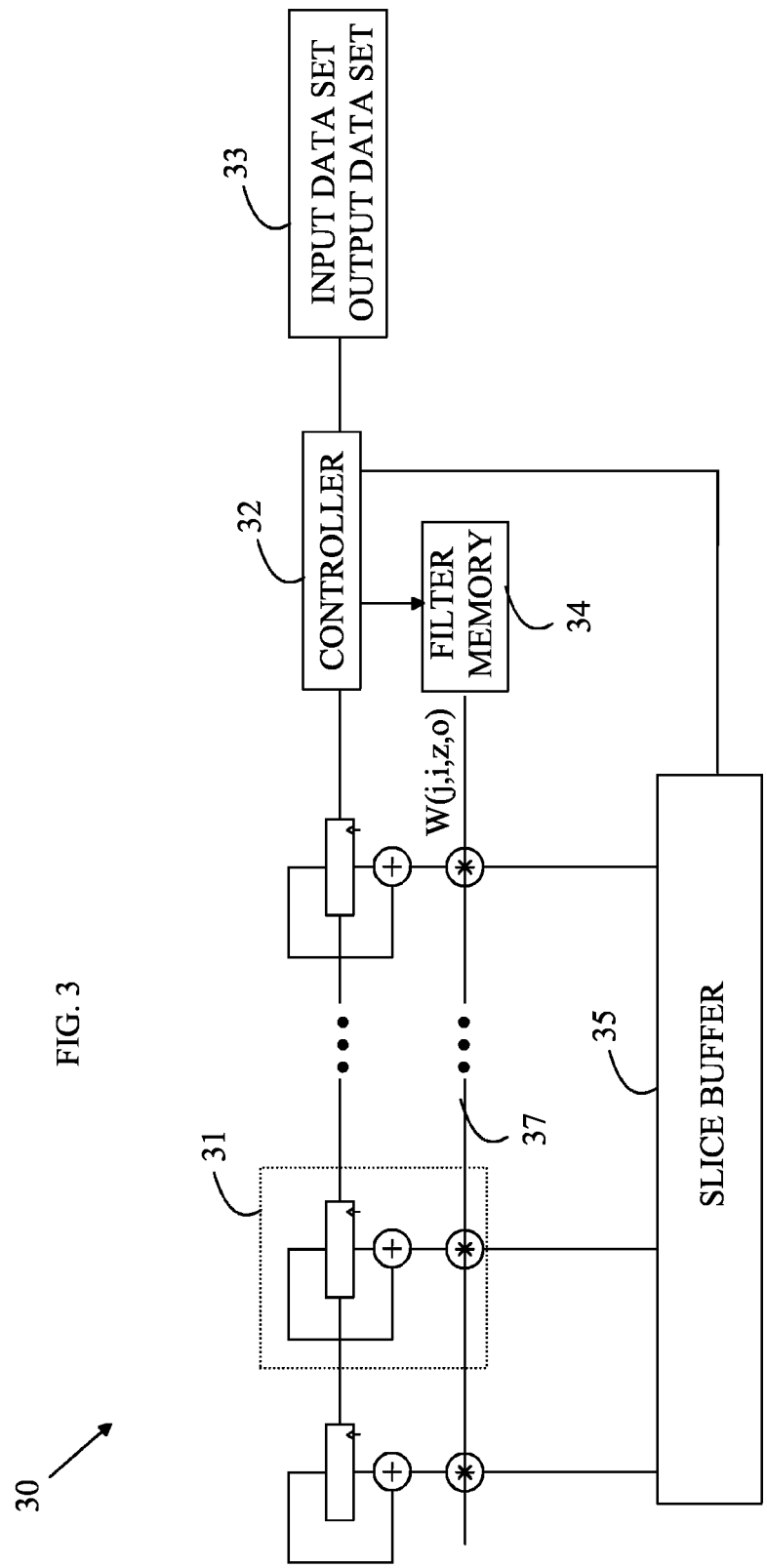
FIG. 3 illustrates one embodiment of a CNN computational engine that utilizes one processing element for x position in the input data set.

Refer now to FIG. 3, which illustrates one embodiment of a CNN computational engine that utilizes one processing element for x position in the input data set. Engine 30 includes a plurality of processing elements analogous to those discussed above and a slice buffer that provides high-speed access to K slices of the input data set. An exemplary processing unit is shown at 31. The input data set and the calculated output data set are stored in a memory 33 having an access time that is greater than that of slice buffer 35. Filter memory 34 holds the weights. The construction of the weight storage will be discussed in more detail below.

The manner in which a single output slice is computed using engine 30 will now be discussed in more detail. At the start of the process, it is assumed that the corresponding slice in the input data set and the slices surrounding it are present in slice buffer 35. Each of the processing elements must compute O scalar products. The same set of weights is utilized for each of these scalar products to avoid the time needed to load different weights into different processing elements.

At the commencement of each of these scalar products, the accumulator registers in the processing elements are reset to 0. At each multiplication, controller 32 broadcasts the weight to be used in that multiplication on bus 37. The appropriate input data set value is retrieved from slice buffer 35 and multiplied by the current weight value and added to the contents of the accumulator. When the K×K×Z multiplies are completed, one of the O values in the output splice is computed by adding the offset corresponding to the current o value to the contents of each accumulator. The accumulators are then zeroed once again and the process repeated for the next o value needed to complete the slice in the output data set. When the slice in the output data set is completed, it is transferred to a slower memory 33.

In the above-described procedure, it is assumed that all of the $K^2ZO$ multiplies and adds are performed during the computation of the output data slice. However, in one aspect of the invention, multiplications and additions in which the multiplications utilize weights that are 0 are skipped to reduce the processing time. It has been observed that in practical applications, a significant number of the weight values are 0. Hence controller 32 skips the computations involving the 0 weights. The manner in which the computations corresponding to 0 weights are skipped without incurring a time delay in the processing will be discussed in more detail below.

Normally, if the engine loads a zero weight, there is insufficient time left in the cycle to skip the computation and load another weight, and hence, there is no advantage in skipping 0 weights once the weight has been loaded. In one aspect of the invention, the weights are presented to the engine in a manner that prevents a zero weight from being loaded in the first place, and hence, the wasted time is prevented.

It should be noted that the order with which the individual multiplies in the scalar product corresponding to a particular filter, o, are performed is irrelevant. For example, in principle, the computation of the various multiplies could be ordered such that all of the non-zero weights are computed together at the beginning of the cycle thereby effectively skipping the 0 weights without incurring any cycle losses. Normally, the individual products are ordered by indexing sequentially through the values for i, j, and z. In such embodiments, the controller discovers the 0 weight when it retrieves the weight corresponding to (i, j, z) values in this predetermined order.

Consider a table for each value of o having the entries (i, j, z, W (i, j, z, o)). The table can be re-ordered by the absolute value of the W entries in descending order. During the computation of the corresponding scalar products, the table entries are utilized in the order of the re-ordered table. For each entry, the corresponding (i, j, z) are used by the controller for loading the appropriate data values from the slice memory to each of the processing elements in the system. When the entry corresponding to a 0 weight is finally encountered, the scalar products in question are completed. The set (i, j, z) can be viewed as an index "vector" whose components specify the weight in the set of weights for filter o that is to be used.

The size of this "table" can be reduced by defining an index function, k(j, i, z) that has a unique inverse. That is, there is a one-to-one relationship between each value of k and the corresponding (j, i, z). The table now becomes a two-column table with each entry being a k value and the corresponding weight value. All zero weight entries can be discarded. The controller then goes through the table one entry at a time. The controller now goes through the table in order and recovers the (i, j, z) value corresponding to the k value.

The above-described table requires a re-ordering of the weights. However, other schemes based on the same index can provide the same benefits while reducing the memory required to store the weights. For example, the (k,W(k)) table can be encoded using run-length encoding. In this type of scheme, the table is encoded as (ZRUN, W) pairs, in which, ZRUN is the number of 0 weights preceding the non-zero weight, W. This encoded sequence can be generated for each filter, o. A special pair can be defined to signal an end of record condition. That is, the previous pair was the last pair in the sequence for which a weight was non-zero. In this embodiment, there is one such encoded sequence of weights for each filter, o.

It should be noted that the encoded weights can be compressed using an entropy encoder such as a Huffman or arithmetic encoder or other lossless compression algorithm. Hence the storage needed for the encoded weights will be significantly less than the storage needed for the unencoded weights. As will be explained in more detail below, the decompression of the compressed run-length encoded weights can be accomplished in a pipelined manner during the processing of the output slice, and hence, the decompression of the weights does not alter the running the time.

In the above-described embodiments, the scalar products were implemented using gMAC processors. Given the large number of processing elements, reducing the area needed for implementing the processing elements can provide significant cost benefits. In one aspect, the area needed for implementing the processing elements is significantly reduced by approximating the weights in such a manner that the multiplications can be implemented using add and accumulate processors in place of gMAC processors.

In the scalar product that determines one value of the output data set, each of the weights can be viewed as a component of a K×K×Z dimension vector. For example, the list of W(k(j,i,z)) provides a representation of such a vector. In one aspect, this weight vector is approximated by the vector having integer components. Pyramid vector quantization (PVQ) provides one mechanism for computing the approximation vector. A PVQ uses a scheme defined by two integers, N, the dimensionality of the vector to be quantized and Q, the amount of quantization. A larger Q value means a better approximation of the original vector. An N-dimensional vector, x, can be approximated by p$\hat{y}$, where p≥0, $$\sum_{i=0}^{N-1} |\hat{y}_i| = Q$$

and all of the components of the vector $\hat{y}$ are integers.

The approximation of a vector by a PVQ vector is particularly attractive for vectors whose components have Laplacian or Gaussian distributions. Many CNNs have weights whose statistical distributions are approximately Laplacian/Gaussian. Such distributions allow the Q/N ratio to be relatively small, while still providing a good approximation to the underlying weight set. In one exemplary embodiment, Q/N is between 1 and 2. In another exemplary embodiment, Q/N is between 3 and 4.

A dot product between any vector, z and a vector, x that is approximated by a PVQ vector requires only one multiplication and Q−1 additions or subtractions depending on the sign of the component of the non-PVQ vector.

$$z \cdot x \approx \rho \sum_{i=0}^{N-1} z_i \hat{y}_i$$

The convolutions shown in Eq. 1 can be reduced to a dot product. For a given value of o, the weights are reduced to a one-dimensional vector that is concatenated with the biases and then approximated by a PVQ vector having the same scaling factor. The components of the approximation vector can then be written in the form $$W(i,j,z,o) \approx \rho \hat{w}(i,j,z,o)$$

and $$b_o \approx \rho \hat{b}_o$$

In this case, it can be seen that $$pout\left(\frac{x}{S_x}, \frac{y}{S_y}, o\right) \approx$$

-continued $$\rho\left(\sum_{z=0}^{Z-1}\sum_{i=0}^{K-1}\sum_{j=0}^{K-1} pin(x+j-K/2, y+i-K/2, z)*\hat{w}(j,i,z,o)+\hat{b_o}\right)$$

Since the vectors components $\hat{w}()$ and $\hat{b}_o$ are integers, the computations of pout( ) can be performed using only accumulators followed by one multiplication by p.

Figure 4:
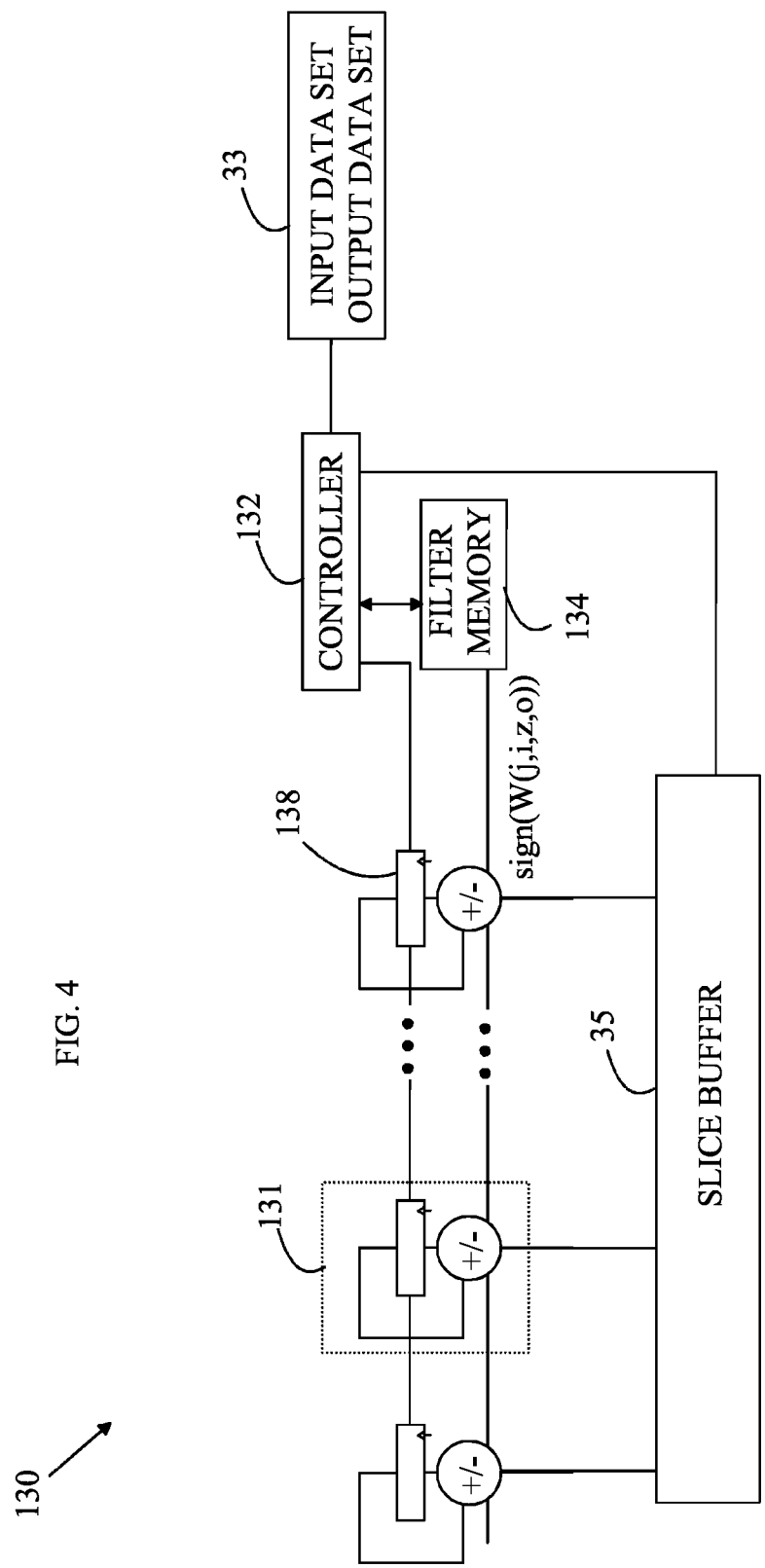
FIG. 4 illustrates another embodiment of a CNN inference engine that utilizes one processing element for each x position in the input data set.

Refer now to FIG. 4, which illustrates another embodiment of a CNN inference engine that utilizes one processing element for each x position in the input data set. In system 130, the processing elements utilize an add/subtract processor such as processor 131 in place of the gMAC processors utilized in engine 30 discussed above. Each add/subtract processor adds or subtracts the data value provided by slice buffer 35 to the result in an accumulator 138 included in that add/subtract processor. The choice of addition or subtraction depends on the sign of the weight currently being processed. The number of times the argument provided from slice buffer 35 is added or subtracted is determined by the absolute value of the weight currently being processed. Controller 132 operates in a manner analogous to controller 32 discussed above. At the start of the computation of an element in the output data set corresponding to a particular filter, controller 32 resets the accumulators to 0. As each new weight is processed, controller 132 adds or subtracts the values from slice buffer 35 to the relevant accumulators a number of times that is determined by the weight being processed. At the end of each multiply by addition, the result must be scaled with a single multiplication as discussed above. Filter memory 134 serves an analogous function as filter memory 34 discussed above.

If the magnitude of the weight being processed is greater than some minimum weight that depends on the hardware being used for processor 131, the time to complete the multiplication will be greater than that of a system using gMAC processors. However, the semiconductor area needed for a gMAC that can perform one multiplication per clock cycle is an order of magnitude greater than the area needed to construct a simple accumulator. The amount of semiconductor area saved by the approximation can be used to construct additional processing elements that can then be used to improve the speed of the computation. Embodiments in which the number of processing elements exceed X will be discussed in more detail below.

It should also be noted that the strategies for skipping 0 weights and compressing the set of weights can be applied to a system which utilizes the PVQ approximations of the weights. Since the weights are now typically small integers, compression of the weight set can be much better using the approximations.

While the approximation of the weights by PVQ vectors makes possible the replacement of a gMAC by an accumulator that requires an order of magnitude of less semiconductor area, the time to compute a slice of the output data set is substantially increased by the need to perform multiplies by multiple additions. This penalty is somewhat reduced by the existence of more 0 weights and the observation that many of the weights are small integers.

A processing element that avoids the hardware of a gMAC processor that performs the multiply and addition in one cycle while providing a reduced multiplication time relative to an accumulator that multiplies by N by executing N adds would be advantageous.

To simplify the following discussion, consider a single processing element that computes one scalar product of an integer weight vector with a vector from the input data set. The case in which the weight is a floating point number will be discussed in more detail below. To simplify the discussion, the weights will be labeled with a single index and the corresponding components of the input data set will also be indexed with a single index.

Hence, the scalar product in question can be written as $\Sigma_{i=0}^{N-1} w_i x_i$. The weight $w_i$, can be expanded in terms of binary operations needed to compute that weight as follows:

$$w_i = \sum_{j=0}^{nb-1} d_{ij} 2^j$$

where the $d_{ij}$ are the binary "digits" of the weight. Using this notation, it can be seen that the scalar product can be re-written in the form:

$$\sum_{i=0}^{N-1} w_i x_i = \quad (2)$$
$$\left(\ldots\left(\left(\sum_{i=0}^{N-1} d_{bn-1,i} x_i\right)2 + \sum_{i=0}^{N-1} d_{bn-2,i} x_i\right)2 + \ldots\right)2 + \sum_{i=0}^{N-1} d_{0,i} x_i.$$

Here N is the dimension of the linear vector, and nb is the number of bits for the weights. It follows from Eq. 2 that the scalar product can be computed by calculating the contributions provided by the various bits of the weights first and then combining these after multiplication by 2. Multiplication by 2 is equivalent to a shift of the accumulator register. The digits of the decomposed weight component can be ordered in the order of their significance in the decomposition, the digit that multiplies the highest power of 2 being the most significant, and so on.

It should be noted that a system with a single BLMAC processor can perform a scalar product in significantly fewer operations than a conventional MAC that utilizes a add and shift register. Consider the computation of the scalar product of two vectors, w and x. The scalar product can be written in the form $$w \cdot x = \sum_{i=0}^{N-1} w_i x_i.$$

The multiply can be computed using a shift and add processor by replacing $w_i$ by the binary digit representation "$d_{ij} 2^j$", where the $d_{ij}$ are either 0, or 1. In a conventional multiplier, $x_0$ is added to the accumulator if $d_{00}=1$. If $d_{00}$ is $=0$, no addition takes place. The contents of the accumulator are then shifted one place to the left, and the process is repeated for $d_{10}$ and $x_0$ followed by a shift of the accumulator, and so on. Hence, the product $w_0 x_0$ requires at least nb−1 shifts and adds. This workload is incurred for each of the other N multiplies in the scalar product; hence the total workload is (N−1)*nb shifts and N*nb adds.

The multiply can be computed using a shift and add processor by replacing $w_i$ by the binary digit representation "$d_{ij} 2^j$", where the $d_{ij}$ are either 0, or 1. In a conventional multiplier, $x_o$ is added to the accumulator if $d_{00}=1$. If $d_{00}$ is $=0$, no addition takes place. The contents of the accumulator are then shifted one place to the left, and the process is repeated for $d_{10}$ and $x_o$ followed by a shift of the accumulator, and so on. Hence, the product $w_0 x_0$ requires at least nb−1 shifts and adds. This workload is incurred for each of the other N multiplies in the scalar product; hence the total workload is (N−1)*Nb shifts and N*Nb adds.

In a BLMAC, all of the multiplications at a given bit level are performed first without shifting the accumulator. At the end of the additions at that bit level, the accumulator is shifted once. That is, the partial product:

$$\sum_{i=0}^{N-1} d_{ij} x_i$$

is computed for a given value of j by adding the $x_i$ that are multiplied by a non-zero $d_i$ to the accumulator without shifting the accumulator. The partial product is stored in the accumulator at the end of this process. The accumulator is then shifted once and the process repeated for the next value of j. Accordingly, only nb shifts are needed and the number of adds is equal to the number of non-zero "digits" at that bit level. Since nb is much smaller than N, and the number of non-zero "digits" is typically much less than nb the computational workload is significantly reduced.

The manner in which this procedure differs from a conventional MAC unit can be more easily understood with reference to a simple example. Consider the scalar product of an integer vector W=(1, 27, 7, 0, 2) with a vector X=(X0, X1, X2, X3, X4). The bits, Di, of the weight vectors are shown below in Table 1. Each weight occupies one column of the table. In a conventional MAC, the contribution of W0X0 is computed and added to the contribution from W1X1, and so on. At the bit level, each contribution is computed by an add and shift operation. For example, the product, W1*X1, would be computed by adding X1 into the accumulator (D0=1), shifting the accumulator one position to the right and adding X1 to the current contents of the accumulator, since D1=1. The accumulator would then be shifted twice, as D2=0. Then X1 would be added again (D3=0) and the accumulator shifted again. Finally, X1 would be added again, since D4=1. In essence, a conventional MAC operates on all of the bits in a column before going on to the next column.

The MAC corresponding to Eq. 2 operates by generating the contributions of all of the weights for a particular bit level and then going on to the next bit level and so on. The bit levels specify the ordering discussed above. This type of MAC will be referred to as a BLMAC. A BLMAC operates by computing the contribution of each row to the accumulator and then shifting the accumulator once. In the current example, the BLMAC would add X1 to the accumulator and then shift the accumulator. Since all other bits on level 4 are 0, this is the only addition. This is repeated at level 3 since only W1 has a bit that is not 0. After shifting, the BLMAC proceeds to level 2 and adds X2 to the accumulator before shifting the accumulator. At level 1, there are three no-zero bits, and hence, X1, X2 and X4 are added before shifting. Finally, X0, X1, X2 are added.

TABLE I

| Bit | W0 = 1 | W1 = 27 | W2 = 1 | W3 = 0 | W4 = 2 |
|---|---|---|---|---|---|
| D4 | 0 | 1 | 0 | 0 | 0 |
| D3 | 0 | 1 | 0 | 0 | 0 |
| D2 | 0 | 0 | 1 | 0 | 0 |
| D1 | 0 | 1 | 1 | 0 | 1 |
| D0 | 1 | 1 | 1 | 0 | 0 |
|    | X0 | X1 | X2 | X3 | X4 |

The BLMAC has a number of advantages over a conventional MAC. In the above example, the computation would require 16 shift operations and only the computation for W3 could be skipped. If bit level weights are run length encoded in a manner analogous to that described above, the only additions that are needed are for the bits that are not equal to 0. Hence, the gains from the sparse level of non-zero bits can be exploited even when the weight itself is non-zero. As noted above, the weights tend to be distributed such that a large number of small weights are present, which means that the number of 0s in the higher order bits will be significant. If the BLMAC skips all of the 0 bits, the number of additions is equal to the number of non-zero bits.

Figure 5B:
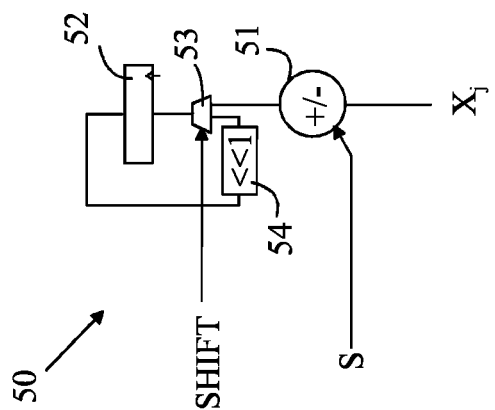
FIG. 5B illustrates an embodiment of a BLMAC in which the contributions of the least significant bit layers are computed.
Figure 5A:
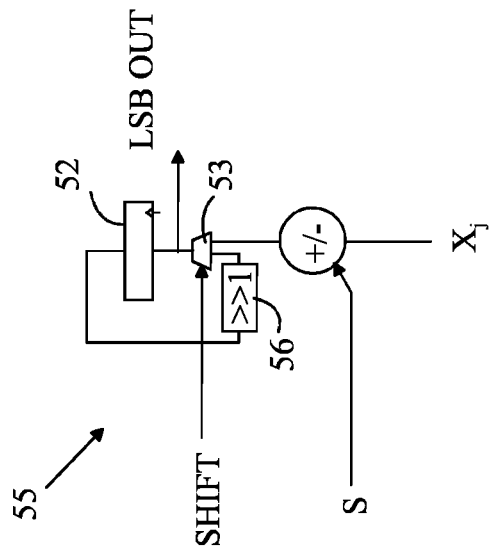
FIG. 5A illustrates one hardware embodiment of a processing element for implementing a BLMAC that operates in the manner described above.

Refer now to FIG. 5A, which illustrates one hardware embodiment of a processing element for implementing a BLMAC that operates in the manner described above. BLMAC 50 includes an accumulator 52 that can be shifted to the left by one position under the control of an accumulator to the one multiplexer 53 and a shift processor 54. An add/subtract processor 51 adds the variable $X_j$ to the contents of accumulator 52. The choice of addition or subtraction is specified by a sign bit, S. The SHIFT signals are provided by a controller that functions in a manner analogous to controller 132 shown in FIG. 4.

The above-described embodiments of a BLMAC operate by generating the contributions of the most significant bits first. However, embodiments in which the contributions of the least significant bits are computed first can also be constructed. Refer now to FIG. 5B, which illustrates an embodiment of a BLMAC in which the contributions of the least significant bit layers are computed. The contents of the accumulator are shifted to the right one position after the contributions of each bit layer have been added. To simplify the discussion, those elements of BLMAC 55 that serve functions that are the same as elements in BLMAC 50 have been given the same numeric designations. In BLMAC 55, shift processor 54 shown in FIG. 5A has been replaced by a right shift processor 56. The least significant bit can be stored in a register or discarded provided there is sufficient accuracy in the remaining sum.

The above described examples only used positive weight values. There are multiple possibilities for encoding negative weights. The simplest way is to encode a weight as two's complement number. A negative weight will have one for its most significant bit. This bit will be used to change the accumulator to subtract the corresponding $x_j$ value. The problem with this representation lies in the fact that the number of non-zero bits in a small magnitude negative number is large, and hence, the time to process the contributions of the various bit layers is longer.

In one aspect of the invention, a ternary representation of the weights is utilized in which the weights are represented by $$w_j = \sum_{i=0}^{nb-1} d_{ij} 2^i$$

where $d_{ij}$ can be −1, 0, or 1. In such a representation, there may be multiple representations for a particular weight. For example, the number 5 can be represented as (101) and −5 can be represented as (−1,0,−1). In this example the representations have the same number of non-zero values. In some cases, the redundancy in the representation can be used to reduce the number of non-zero bits to provide faster processing. To simplify the following discussion, $d_{ij}$ will be referred to as the $i^{th}$ digit of the weight j. In the binary case, the digits are bits of the binary representation of the weight component. In the trinary case, the digits can be −1,0, or 1.

Consider the example shown in Table I above. Using the ternary coding, the Table becomes

TABLE II

| Bit | W0 = 1 | W1 = 27 | W2 = 1 | W3 = 0 | W4 = 2 |
|-----|--------|---------|--------|--------|--------|
| D5  | 0      | 1       | 0      | 0      | 0      |
| D4  | 0      | 0       | 0      | 0      | 0      |
| D3  | 0      | 0       | 1      | 0      | 0      |
| D2  | 0      | −1      | 0      | 0      | 0      |
| D1  | 0      | 0       | 0      | 0      | 1      |
| D0  | 1      | −1      | −1     | 0      | 0      |
|     | X0     | X1      | X2     | X3     | X4     |

When a 1 is encountered, the corresponding $x_i$ is added, and when a "−1" is encountered, the corresponding $x_i$ is subtracted. The number of non-zero entries is now reduced from nine to seven, and hence, the processing speed is increased.

The above examples utilize integer weights; however, the same technique can be applied to floating point weights by first scaling the weight to provide an integer. At the end of the processes, the scaling factor can be applied to the result in a manner analogous to that described above with respect to PVQ weights, provided the same scaling factor is applied to all of the weights of a filter.

In the above-described examples, the weight matrix and the input data set values that are multiplied by the weights were written as linear vectors, $\hat{w}_i$ and $x_i$ to simplify the discussion. However, in practice, the weights are tensors that are specified by multiple indices, (i,j,z,o). In BLMAC embodiments, each weight is coded as a ternary bit representation and is specified by five indices, (i,j,z,o,b), where b denotes the bit level of the bit of the weight (i,j,z,o). The input data set value that is multiplied by a weight depends on the x coordinate of the corresponding processing element and (i,j,z).

Figure 6:
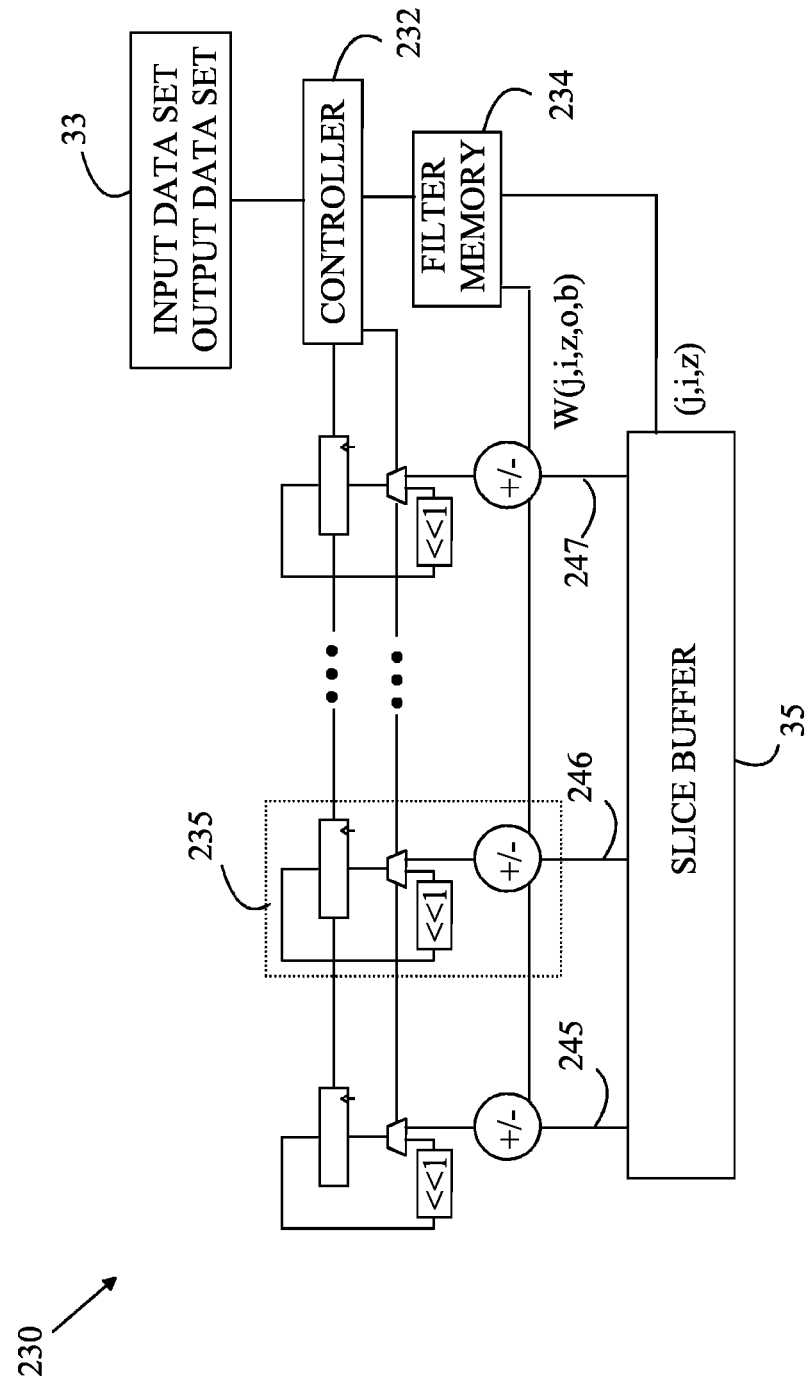
FIG. 6 illustrates another embodiment of a CNN inference engine that utilizes BLMAC processing elements.

Refer now to FIG. 6, which illustrates another embodiment of a CNN inference engine that utilizes BLMAC processing elements. In system 230 there is one BLMAC processing unit 235 for each x location in the input data set. The input and output data sets are stored in a memory 33 that has access times that are much slower than that of slice buffer 35. Slice buffer 35 operates in a manner analogous to that described above with reference to the systems shown in FIGS. 3 and 4. Slice buffer 35 presents the appropriate entries from the input data set on each of a series of output ports; ports 245-247 being examples of these ports. To simplify the following discussion, these ports will be labeled with the number of the x-component that is transmitted through the port. As will be discussed in more detail below, additional ports for x component values that are outside the input data set are also provided. The input data set value presented on any given port is determined by the x value associated with that port and the value of the index (j,i,z), which is provided by controller 232 via filter memory 234 in a manner analogous to that discussed above with respect to FIGS. 3 and 4.

At the start of the processing for a given (i,j,z,o), the accumulators in BLMAC processing unit 235 are set to zero. Controller 232 then presents the values of the weight denoted by (i,j,z,o) one bit at a time, starting with the most significant bit level. After all of the non-zero bits for a given level are processed, controller 232 causes each of the accumulators to shift one position to the left. Controller 232 then moves to the next level of bits without resetting the accumulators. When all of the bit levels have been processed, the offset is added to each accumulator and the result is output as a slice of the output data set. If a scaling factor was applied to the weights, the result is scaled prior to being output. Controller 232 then moves to the next value of o, resets the accumulators to zero, and repeats the process.

Figure 7:
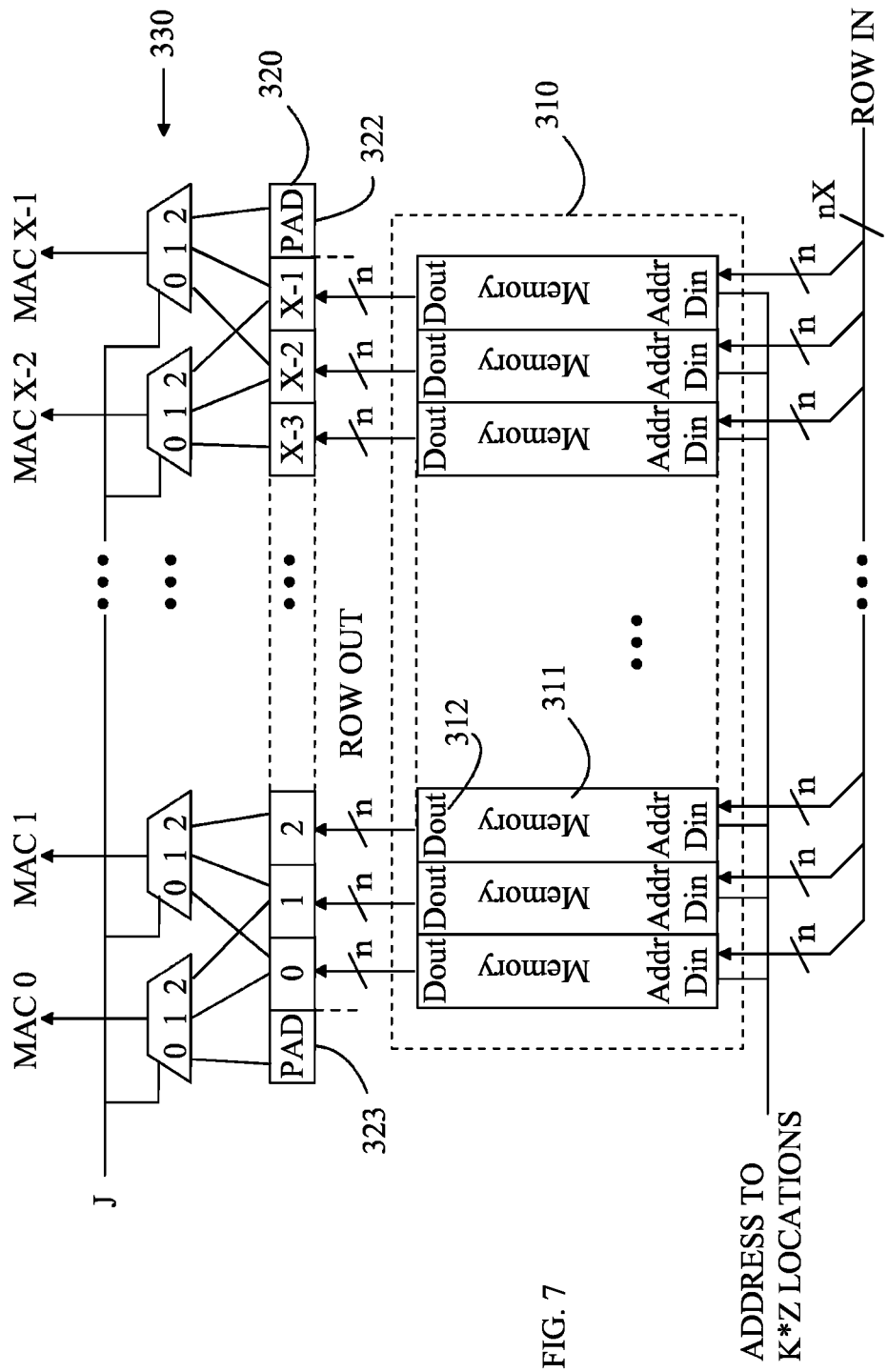
FIG. 7 provides a more detailed illustration of one embodiment of a slice buffer that can be utilized in the above-described embodiments.

The above-described embodiments utilize a slice buffer to store K+1 slices of the input data set. Refer now to FIG. 7, which provides a more detailed illustration of one embodiment of a slice buffer that can be utilized in the above-described embodiments. For the purpose of this example, it will be assumed that each data value in the input data set is represented by an n-bit data word. A slice of the input data set requires K*Z input data set words. The slice buffer must present X input data set values at a time to the bank of X multiply and accumulate elements. The details of the multiply and accumulate elements will depend on the specific embodiment of the CNN inference engine. To simply the discussion, the multiply and accumulate elements are labeled as MAC 0 through MAC X−1 in the drawing.

The specific row of input data values that are presented to the MACs depends on the index vector (j,i,z) discussed above with reference to Eq. (1) and the current slice. The specific row of data values that are presented on the output of the current slice is determined by the indices i and z. The manner in which the index j is used will be discussed in more detail below.

The slice buffer for each slice can be viewed as including a memory bank 310 that holds the KZ words for that slice. Memory bank 310 includes a plurality of such as memory 311. Each memory has an output port 312 that presents one n-bit word to a register 320. In addition, each memory has an input port that allows the memory to be loaded when the slice associated with that slice is not being used. The slice is loaded by inputting a row of input data set values for each of the KZ z-locations in the input data set.

As noted above, the specific set of X values that are exposed by memory bank 310 at its output ports are determined by the values of i and z that are input to memory bank 310. In this embodiment, these exposed values are copied into a register 320 that holds X+K n-bit data values. The additional data values are referred to as "PADs", there being K/2 such locations on each end of register 320. Here, the division is integer, and hence, a register for the case K=3 has one additional location on each end of the register. The PADs provide x-values for indices that are negative or greater than X−1. The use of the PADs will be discussed in more detail below.

To simplify the following discussion, it will be assumed that K=3, and hence, K/2=1 (integer division). Referring to Eq. (1), for a given y and z, the values that are to be presented to $x^{th}$ MAC during the computation, are pin(x+j−1, yslice, z), where yslice indicates the y-value of the current slice. During the computation of the current scalar products, the x values sent to the $x^{th}$ MAC will be x−1, x, and x+1. As can be seen from the bank of X multiplexers in multiplexer bank 330. Each multiplexer couples the desired value to a corresponding MAC when the value of j is input to the multiplexers.

For the purposes of present discussion, it is assumed that the input data values outside of the XY rectangle are zero. Hence, when MAC 0 is to be connected to X−1, the multiplexer connects MAC 0 to a value in the PAD that is loaded with 0. Similarly, the PAD at location X in the buffer register is also loaded with 0. The manner in which the PADs are loaded in embodiments that utilize multiple CNN inference engines of the types discussed above will be explained in more detail below.

The above example assumes that K=3 to simplify the connections between the multiplexers and the MAC inputs. However, in general, K is greater than three. The bank of multiplexers is typically characterized by a maximum K that can be accommodated. K values less than this maximum can be run on a system designed for the larger K value.

In the above-described embodiments, the CNN inference engine had a size that would accommodate the largest input data set that was to be convolved with the filter set. While a smaller input data set could also be convolved by the same hardware, only a fraction of the computational hardware would be utilized. In general, a CNN has several stages. The output of the first stage is input to a second stage, and so on. Along the way, the sizes of X and Y in the input data set to a stage are reduced, usually by a factor of two. For example, an output data set can have a reduced X and/or Y range as a result of pooling or a similar down sampling process. As a result, the next CNN stage may have X/2 and Y/2 spatial elements in its input data set. A system with X processing elements can still be utilized for processing the reduced input data set to the next stage of the CNN; however, this would leave half or more of the computing capacity of the system used to process the first stage idled. It should also be noted that the Z for the next stage may be significantly greater than that of the first stage, and hence, the time to compute the output data set may actually increase if all of the computational power cannot be applied at each stage. Hence, it would be advantageous to provide a method for utilizing the idled capacity during subsequent processing stages.

To simplify the following discussion, it will be assumed that the first CNN stage has a spatial size of X and Y. During subsequent layers of the CNN, X and Y are reduced by a factor of two. This reduction will be assumed to have occurred s times. Consider a CNN layer at which the spatial sizes are now $X/2^s$ and $Y/2^s$. At this layer, the input data set, $[X_L,Y_L,Z_L]$, is mapped to an output data set $[X_L,Y_L,O_L]$ by a filter set $W[K,K,Z_L,O_L]$. From Eq. 1, $$pout(x, y, o) = \sum_{z=0}^{Z_L-1} \sum_{i=0}^{K-1} \sum_{j=0}^{K-1} pin(x+j-K/2, y+i-K/2, x) * W(j, i, z, o) + b_o$$

In this aspect of a CNN inference engine according to the present disclosure, the input data set is divided along the Z-axis into $2^s$ separate partial summations that can be performed in parallel in which each summation does not share memory or weights with the other summations until after each of the partial summations has been completed. After completion, the partial summations are added together to provide pout( ).

$$pout(x, y, o) = b_o + \sum_{t=0}^{2^s-1} S_{t,x,y,o}$$

where $$S_{t,x,y,o} = \sum_{z=\Delta z_t}^{\Delta z_{t+1}-1} \sum_{i=0}^{K-1} \sum_{j=0}^{K-1} pin(x+j-K/2, j+i-K/2, z) * W(j, i, z, o)$$

and $$\Delta Z_t = t \frac{Z_L}{2^s}$$

It would be advantageous to provide a modular processing element that can be used for assembling CNN inference engines of various sizes. Each modular processing element would include its own slice buffer that is sized for a CNN of some predetermined maximum X, Xmax. A modular processing element can be used together with an appropriate controller to provide a small CNN inference engine. Alternatively, a plurality of modular processing elements can be connected together to form a larger CNN inference engine for an input data set having an X value less than or equal to the sum of the Xmax values of the component modular processing elements. The connections between the modular processing elements can be hardwired or provided by switches that are under the control of a controller in the CNN inference engine.

The modular processing elements could be constructed as individual customized integrated circuits which are then connected together at packaging. Alternatively, the modular processing elements could be components in a library for custom integrated circuit fabrication. In addition, the modular processing elements could be implemented in a field programmable gate array.

To provide the desired connectivity, the contents of the PAD regions of the slice buffers need to be varied depending on the location of a modular processing element in an array of such modular processing elements. Refer again to FIG. 7. PAD region 322 will be referred to as the right PAD in the following discussion, and PAD 323 will be referred to as the left PAD. Each PAD is Kmax/2 n-bit words long, where Kmax is the maximum value of K for which the modular processing element is designed. When the modular processing element operates in a standalone mode, each of the pad regions contains zeros. When two modular processing elements are connected to one another, the pads must be loaded with the X values of the KMax/2 entries in register 320 of the adjoining modular, element.

Figure 8:
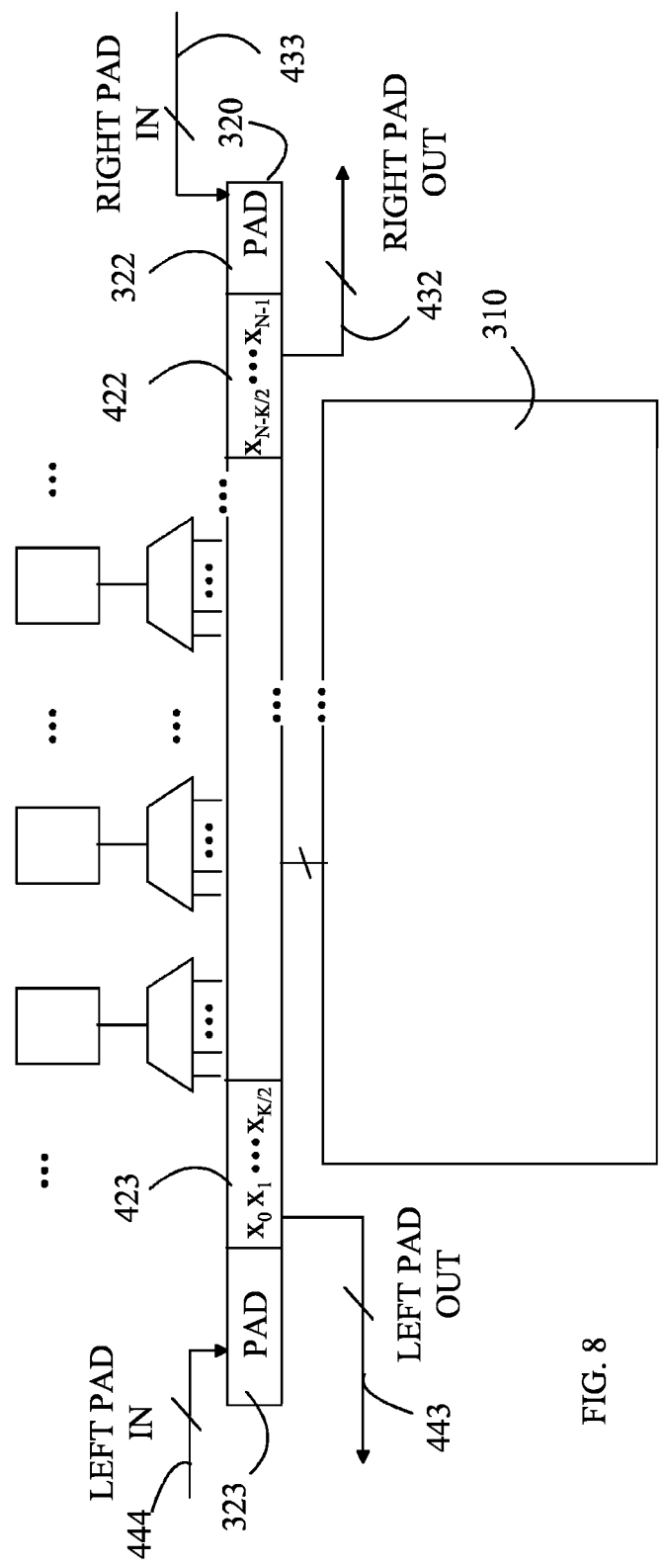
FIG. 8 is a more detailed view of register 320 shown in FIG. 7.

Refer now to FIG. 8, which is a more detailed view of register 320 shown in FIG. 7. In this example, the right pad region 322 is loaded from a right pad in bus 433. Similarly the left pad 323 is loaded from a left pad in bus 444. Both of these buses transferred KMax/2 n-bit words. The contents of the KMax/2 words 422 are copied out of register 320 by a bus 432. Similarly, KMax/2 words 423 are copied out of register 320 on bus 443.

Figure 9A:
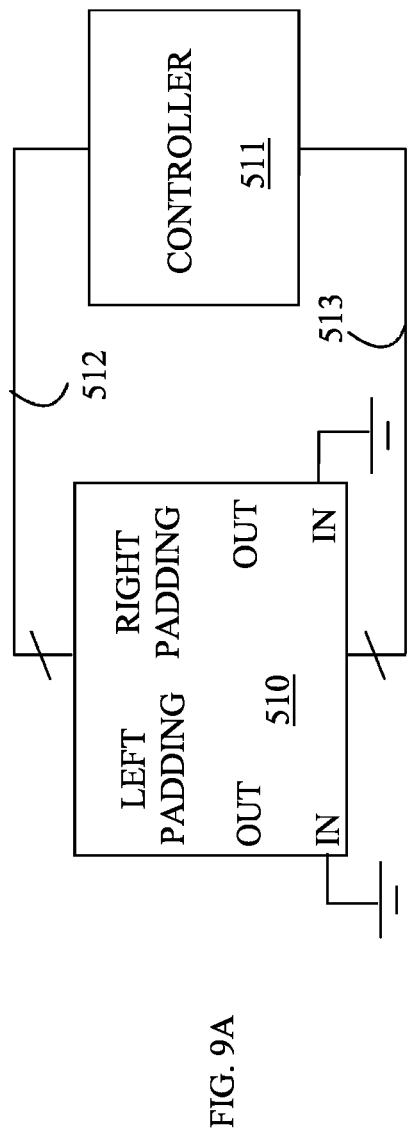
FIGS. 9A and 9B illustrate the manner in which the modular processing elements can be connected to provide a CNN inference engine having different capacities.
Figure 9B:
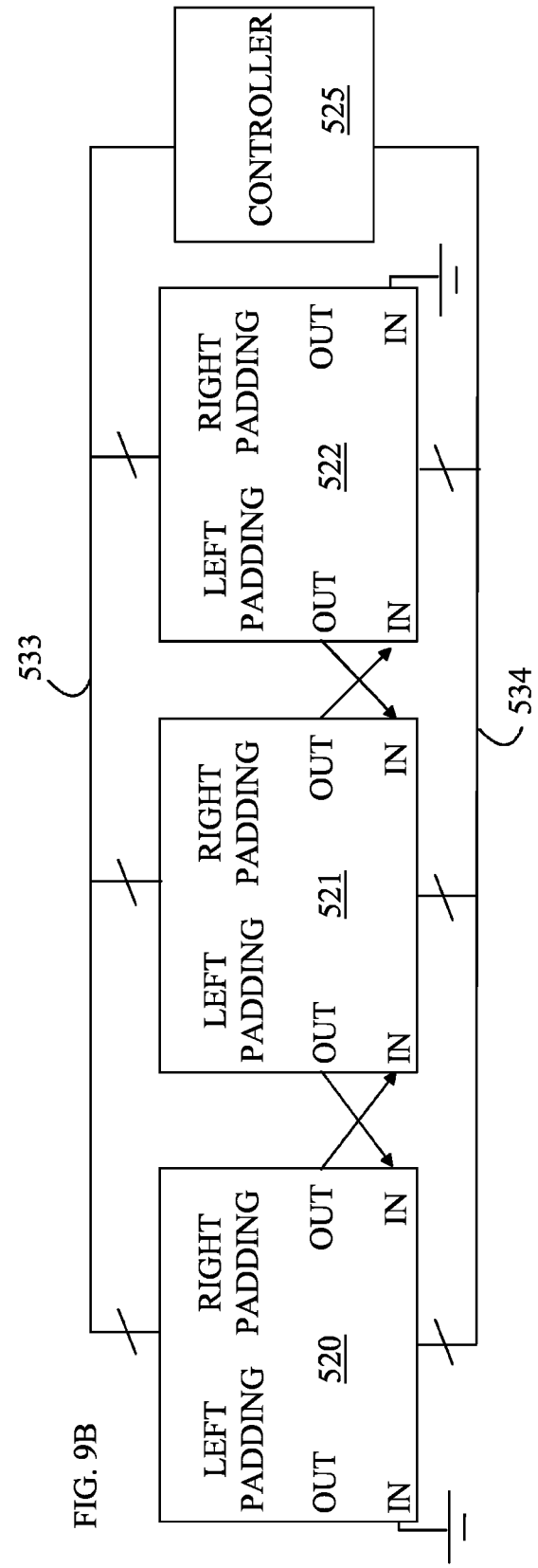

Refer now to FIGS. 9A and 9B, which illustrate the manner in which the modular processing elements can be connected to provide a CNN inference engine having different capacities. FIG. 9A illustrates a CNN inference engine having one modular processing element 510 that is controlled by a controller 511. In this example, the left and right padding inputs are connected to ground thereby forcing zeros into the padding areas of register 320 discussed above. The input data stream for loading the slice buffer and memory bank 310 is provided on a bus 513. Similarly, the accumulators in modular processing element 510 are controlled on a bus 512 which provides the weights used by the MACs in modular processing element 510 and controls the order in which the multiply and accumulate operations are carried out.

Refer now to FIG. 9B. In this example, the CNN inference engine includes three modular processing elements shown at 520, 521, and 522. The left padding input to modular element 520 and the right padding input to modular processing element 522 are connected to ground. Internally, the right padding output of a modular processing element is connected to the left padding input of the next modular processing element. Similarly, the left padding output of the interior of the modular processing elements are connected to the right padding inputs of the modular processing elements. Hence, the three modular processing elements operate as if they are part of a single register. The input data for the slice buffers in the various modular processing elements is provided on bus 534 by controller 525. Similarly, the accumulators in the modular processing elements are controlled on a bus 533 which provides the weights used by the MACs in modular processing elements and controls the order in which the multiply and accumulate operations are carried out.

Consider a CNN computational engine having eight modular processing elements and a controller. It is assumed that the connections between the PAD in and out ports are implemented in switches that are controlled by the controller. Initially, the modular processing elements are connected to provide one large processing element of a size that just accommodates a CNN of size XY. After the first convolution is completed, X and Y are reduced by a factor of two, each by a process that is implemented in the controller and does not depend on the parallel computational capabilities of the bank of MACs. For the purposes of this example, it will be assumed that the first convolution generated an output data set with Z equal to 16. At this point, only half of the MACs are needed to process the next convolution. Hence the controller will reconfigure the modular processing elements into two independent computational engines having four modular processing elements each. The first computational engine will compute the partial output data set for z values of 0 through 7. The second computational engine will compute the partial output data set for z values of 8 through 15. The two partial output data sets are then combined as described above to provide the final output data set at this stage of the convolution. After this second convolution, a second reduction of a factor of two is applied, and the controller reconfigures the eight modular processing elements into four computational engines, each with two of the modular processing elements combined. The process is then repeated until the final output data set is generated.

Since a modular processing element may be working with a different weight set than another one of the modular processing units in a CNN inference engine, in one aspect, each modular processing unit receives compressed weights from an external memory and expands the compressed weights to provide a set of indices (i.e., (j,i,z)) and the corresponding non-zero weight for that index. A modular processing element that includes the weight receiving hardware and generates its own set of weights will be referred to as a "tile" in the following discussion.

Figure 10:
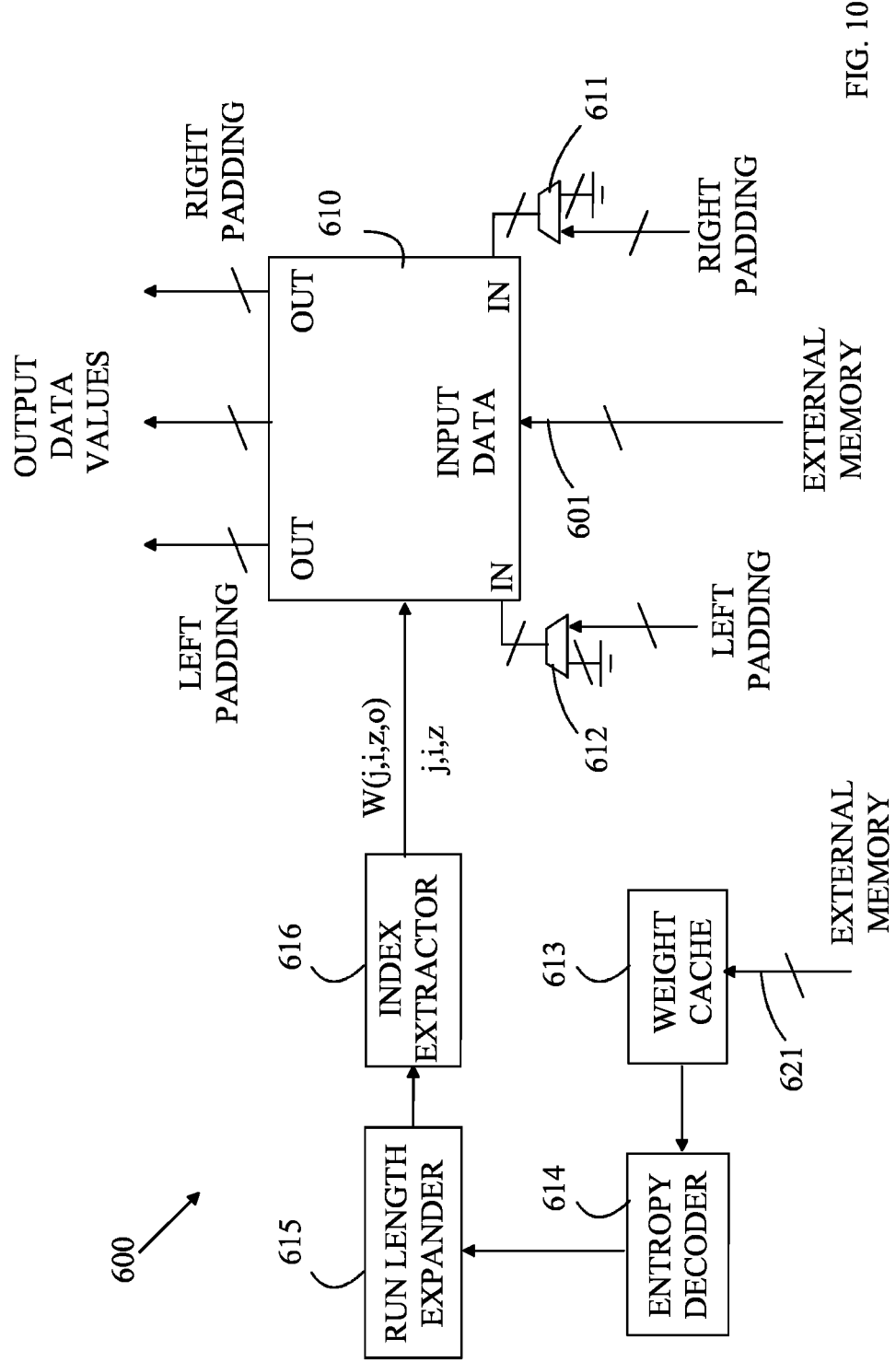
FIG. 10 illustrates one embodiment of a tile that can be used in constructing a CNN inference engine.

Refer now to FIG. 10, which illustrates one embodiment of a tile that can be used in constructing a CNN inference engine. Tile 600 includes a modular processing unit 610 which operates in a manner analogous to that described above. The input padding is controlled by multiplexers 611 and 612. If the tile is the first or last in an engine, the input padding is set to zero by multiplier 612 if the tile is the first in the engine and to zero by multiplexer 611 if the tile is the last. Modular processing unit 610 also includes ports for outputting the left and right padding. The padding connections have been described above, and hence, will not be discussed here. The input data set for the slice buffer in modular processing unit 610 is received from external memory on an input memory port 601.

Tile 600 also has a weight input port 621 that receives a compressed weight file and stores the compressed weights in weight cache 613. The weights are compressed for two reasons. First, while the above-described examples utilize weight sets that are relatively small compared to the input data set, many real world CNNs operate with much larger weight sets. In those cases, the memory for storing the weights in fast memory on the tile is excessive. Hence, the need for compression to reduce the amount of memory. Furthermore, the actual weight set used by a particular tile may be less than the full weight set.

The second reason for the weight compression is to code the weights such that weights that are zero can be skipped without penalty. As noted above, the weights are preferably coded using run-length encoding which inherently skips to the next non-zero weight. The count of the weights skipped is decoded to provide the indices of the non-zero weight.

In this example, it is assumed that the run-length encoded weights were compressed using entropy encoding. To generate the weight to be used in the next multiplication, the compressed weight is read from weight cache 613 and decoded by entropy decoder 614 to generate a run-length coded weight set. Run length expander 615 generates the run-length encoded sequence which is then examined by index extractor 616 to find the next non-zero weight and the number of weights that were skipped to arrive at that weight. The skipped weights determine the index of the weight, the coded value being the weight itself.

In this example, entropy encoding was used to compress the run-length encoded data. However, other lossless compression schemes could also be utilized. In one aspect, the decompression and weight generation operations are pipelined such that one weight and index is generated at each multiplication cycle, thereby eliminating delays in the scalar product generation by the weight extraction.

It should be noted that a full CNN inference computation includes a number of other steps whose details have been omitted from the above discussion. The above examples explain the parallel computational engine that facilitates the scalar products needed for computing an output data set from an input data set at various stages in the overall computation. These additional computations can be carried out by the controller that manages the computational engines discussed above. Such computations do not require the high level of parallel processing discussed above, and hence, can be implemented on a more conventional computing hardware.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A CNN inference engine that convolves an input data set with a weight data set to generate an output data set, said CNN inference engine comprising:

an inference engine weight port adapted to receive a weight value and a weight index vector;

a plurality of MACs, each of said plurality of MACs comprising an input data value port, a MAC weight port, and an accumulator, said MAC causing a value in said accumulator to be augmented by a product of a data value received on said input data value port and said weight value received on said inference engine weight port; and a slice buffer characterized by a plurality of output ports, each of said plurality of output ports being connected to a unique one of said plurality of MAC input data value ports, said slice buffer storing a plurality of slices, said CNN inference engine causing said slice buffer to connect one of said plurality of slices to said plurality of slice buffer output ports, and causing said weight received on said inference engine weight port to be input to each of said plurality of MAC weight port, and causing said plurality of MACs to process said input data values on said output ports in said one of said plurality of slices in parallel.

2. The CNN inference engine of claim 1 wherein one of said plurality of MACs are general purpose MACs.

3. The CNN inference engine of claim 1 wherein one of said plurality of MACs utilizes integer weights and multiplies by adding said input data value to said value in said accumulator without shifting said accumulator.

4. The CNN inference engine of claim 1 wherein one of said plurality of MACs is a BLMAC.

5. The CNN inference engine of claim 4 wherein said weight values are coded using a trinary coding scheme in which numbers are represented by digits having values of −1, 0, and 1 and in which a weight value is represented by a set of digits having the fewest non-zero bits for that weight value.

6. The CNN inference engine of claim 1 wherein said weight data set comprises a plurality of filters, each filter being adapted to filter a K×K block of input data set values to generate an output data set value, said slice buffer comprises storage for K slices of said input data set, said slice buffer storing sufficient input data set values to compute a slice of said output data set.

7. The CNN inference engine of claim 6 wherein said slice buffer stores K+1 slices of said input data set, said (K+1)st slice being loaded with a new value while said K slices are being used to compute said slice of said output data slice.

8. The CNN inference engine of claim 6 wherein said plurality of output ports in said slice buffer comprise left and right padding arrays, said left and right padding arrays providing values to said MACs for data values that are outside of said values stored in said slice buffer.

9. The CNN inference engine of claim 8 wherein said slice buffer comprises a left and a right padding out port, said left padding out port connecting K/2 output ports having a first set of labels to an external device and said right padding out port connecting K/2 output ports having a second set of labels to another external device.

10. The CNN inference engine of claim 1 wherein each of said slice output ports is characterized by a unique label and wherein said input data set values coupled to said slice buffer output ports are determined by said unique label and said weight index vector of said weight currently coupled to said inference engine weight port.

11. The CNN inference engine of claim 1 wherein said inference engine weight port receives a run-length encoded representation of said weight data set and decodes said run-length encoded representation to provide a list of weight values that are different from zero and a number of weights to be skipped before reaching a non-zero weight value.

12. The CNN inference engine of claim 11 wherein said inference engine weight port generates said weight index vector from said run-length encoded representation of said weight data set.

13. The CNN inference engine of claim 11 wherein said run-length encoded representation of said weight data set comprises a compressed version of said run-length encoded representation and said inference engine weight port decompresses said run-length encoded representation.

14. The CNN inference engine of claim 13 wherein said compressed version of said run-length encoded representation of said weight data set is stored in a cache memory in said CNN inference engine.

15. A system that computes a scalar product of a vector, x, and a weight vector, w, each component $w_i$ of said w vector being decomposable into a respective plurality nb of digits, where $w_i = \Sigma d_{ij} 2^j$, $d_{ij}$ having an absolute value of 1 or 0, j running from 0 to nb−1, said system comprising:

one or more of BLMAC processors, each BLMAC processor comprising:

an accumulator initially set to 0;

a shifter that shifts a number in said accumulator in response to a shift command, said shift causing a multiplication by 2 of said number in the case of right shifts or a division by 2 in the case of left shifts;

an input port adapted to receive a component $x_i$ of said x vector;

a weight port adapted to receive a digit $d_{ij}$ of a component $w_i$ of said w vector; and an add/subtract processor that processes said received component $x_i$ of said x vector by causing said component $x_i$ of said x vector to be added or subtracted to a value in said accumulator depending on said received digit $d_{ij}$ value and a sign input, such that at the end of an addition or subtraction at a given digit level j, a partial product $\Sigma_{i=0}^{N-1} d_{ij} x_i$ is computed and stored in said accumulator, and said accumulator is then shifted once for the next value of j in response to said shift command, such that at most (N−1)*nb shifts and N*nb add/subtracts are needed to compute said scalar product.

16. The system of claim 15 wherein the plurality of digits $d_{ij}$ of each component $w_i$ of said weight vector are ordered in an order that depends on the significance of said digits, and wherein said system couples each of said non-zero digits to each of said one or more BLMAC processors and causes said one or more BLMAC processors to process said component of said vector x in parallel, said system causing a value in each of said accumulators to be shifted after said processing.

17. The system of claim 16 wherein said digits that are equal to zero are not coupled to said one or more BLMAC processors.

18. A method for operating a data processing system having an accumulator and add/subtract processor to compute a scalar product of two N dimensional vectors, w and x, said vector w having components $w_i$, where $w_i = \Sigma d_{ij} 2^j$, $d_{ij}$ having an absolute value of 1 or 0, j runs from 0 to nb−1, said method comprising:

resetting said accumulator to zero;

for each j, adding or subtracting $x_i$ from said accumulator depending on said $d_{ij}$ value for each non-zero value of $d_{ij}$ using said add/subtract processor; and shifting said accumulator one position, such that at the end of an addition or subtraction at a given digit level j, a partial product $\Sigma_{i=0}^{N-1} d_{ij} x_i$ is computed and stored in said accumulator, and said accumulator is then shifted once for the next value of j, such that at most (N−1)*nb shifts and N*nb add/subtracts are needed to compute said scalar product.

19. The method of claim 18 wherein said possible $d_{ij}$ values are −1, 0, and 1.

20. The method of claim 18 wherein said possible $d_{ij}$ values are 0 and 1.

* * * * *